United States Patent [19]
Voegeli

[11] 3,812,279
[45] May 21, 1974

[54] CABLE TELEVISION HOUSING WITH LOCKABLY JOINED COVER AND BASE

[76] Inventor: Henry Carl Voegeli, 918 Gibbs Rd., Venice, Fla. 33955

[22] Filed: Feb. 12, 1973

[21] Appl. No.: 331,900

[52] U.S. Cl. ............... 174/38, 70/167, 70/DIG. 34, 174/50, 174/66, 220/40 R, 292/304, 339/88 R
[51] Int. Cl. ...... H02g 3/14, H02g 9/00, B65d 55/14
[58] Field of Search ......... 174/37, 38, 50, 52 R, 66; 70/158–173, DIG. 34; 220/40 R, 40 S, 55 L, 55 MC; 285/80, 87, 88, 360, 361, 376, 396, 401, 402; 292/304; 339/37, 82, 88 R, 88 C, 90 R, 90 F

[56] References Cited
UNITED STATES PATENTS

| | | | |
|---|---|---|---|
| 863,427 | 8/1907 | Nikonow | 220/40 R |
| 971,349 | 9/1910 | Billy | 220/40 R |
| 2,133,430 | 10/1938 | Cox et al. | 220/40 R X |
| 2,592,208 | 4/1952 | Stamper | 220/40 R X |
| 3,162,718 | 12/1964 | Gunthel, Jr. | 174/38 |
| 3,652,779 | 3/1972 | Grinols | 174/38 |

FOREIGN PATENTS OR APPLICATIONS

| | | | |
|---|---|---|---|
| 23,114 | 12/1930 | Australia | 339/88 R |
| 6,505,882 | 1/1966 | Netherlands | 174/38 |
| 166,600 | 3/1959 | Sweden | 174/38 |

*Primary Examiner*—Laramie E. Askin
*Attorney, Agent, or Firm*—Stepno, Schwaab & Linn

[57] ABSTRACT

A two part housing comprised of a base adapted to be inserted into the ground and having means supported thereon adapted to be connected to conduit means positioned in the ground and a cover lockably joined to the base for encasing and protecting the connecting means against unauthorized use.

7 Claims, 7 Drawing Figures

PATENTED MAY 21 1974  3,812,279

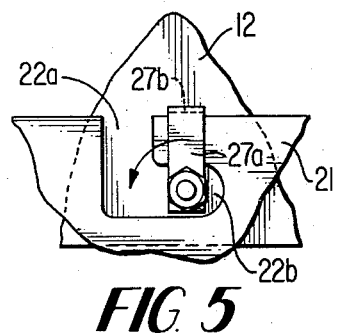
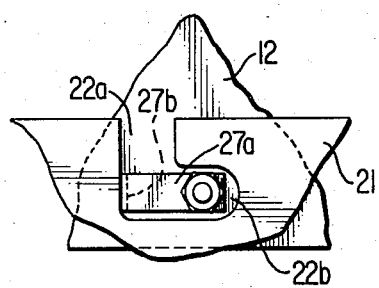
FIG. 5  FIG. 6
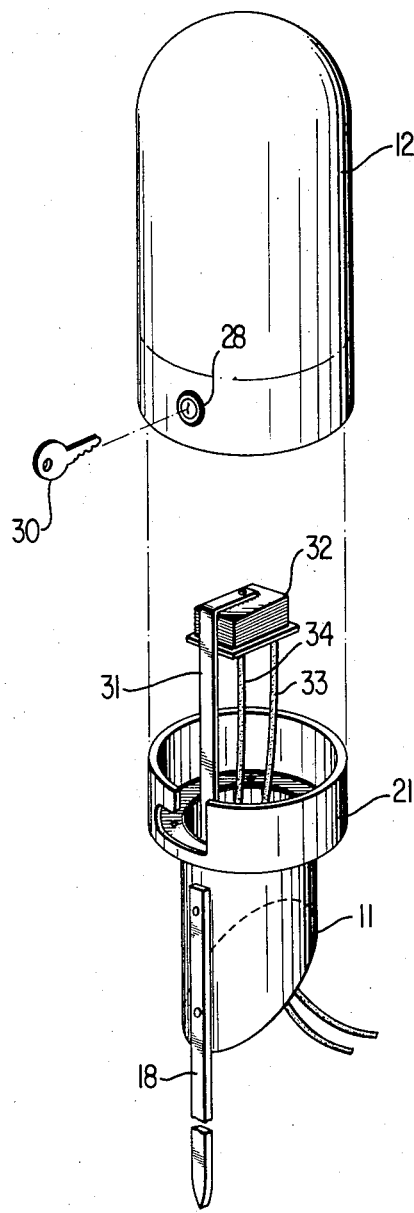
FIG. 7

CABLE TELEVISION HOUSING WITH LOCKABLY JOINED COVER AND BASE

BACKGROUND OF THE INVENTION

With the ever increasing trend to dispose electrical cables, such as power, telephone, and television cables in the ground, a need has arisen to provide means for tapping these cables as the need arises in a simple and economical fashion. This is especially true in the case of cable television wherein the line is initially buried and thereafter tapped as subscribers join the service.

Generally it is known in the prior art to provide access openings at varying locations along an underground conduit and means are provided for permitting authorized entry therein for the inspection and repair of the same.

It is a principal object of the present invention to provide a new and novel housing which permits limited access to the interior thereof wherein connecting means are disposed for connecting the underground cable to a subscriber's premise.

SUMMARY OF THE INVENTION

In accordance with the present invention a two piece housing is provided with the base thereof adapted to be readily inserted into the ground with connecting means supported thereon having leads extending from the buried conduit to the point of use, and a cover for the base encasing and protecting the connecting means from the elements and unauthorized personnel. To this end new and novel locking means are provided for insuring that access to the interior thereof will be limited. The locking means is comprised of a rotatable lug disposed on the interior of the cover which moves into and out of engagement with a locking surface provided in the base member in response to the rotational movement of a key associated with the lug.

BRIEF DESCRIPTION OF THE DRAWINGS

In the accompanying drawings:

FIGS. 3 through 6 depict the novel locking and unlocking sequence for removably connecting the housing to the base; and FIG. 7 is an exploded view of the housing illustrating the component parts thereof.

DESCRIPTION OF THE PREFERRED EMBODIMENT

Figure 1:
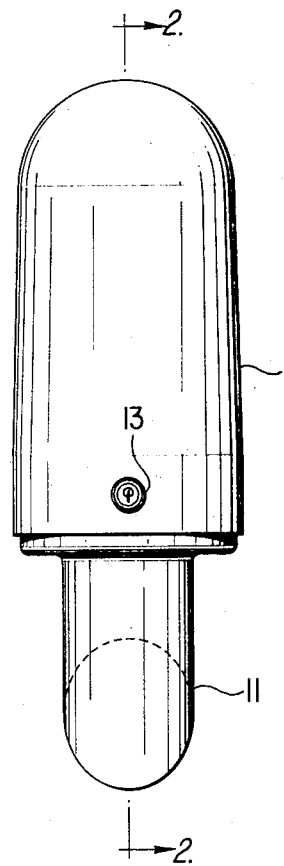
FIG. 1 is a view showing the overall configuration of the housing of the invention.

With reference to FIG. 1 of the drawings, the housing 10 of the present invention is shown as being comprised of a base 11, a cover 12 and locking means 13 removably securing the one to the other. As is more clearly seen in FIGS. 2 and 7, the base 11 is comprised of a cylindrical base 14 cut on a diagonal line 15 thereby providing a short section 16 increasing into a longer section 17. As is apparent, this shape facilitates the insertion of the base into the ground by progressively encountering the resistance afforded by the ground. A pointed stake 18 is connected to the longer section 17 by rivets 19,19 and serves to anchor the base to the earth. The sections 16, 17 of the base 11 extend upwardly and terminate at a common horizontal flange 20 which rests on the top of the ground and which thereafter merges into an upwardly vertical circular extension 21. The extension 21 is provided with a bayonet opening 22 comprised of an entrance opening 22a and a longitudinal opening 22b perpendicular thereto within which the locking means, generally depicted at 23, is disposed as will be explained in more detail hereinafter.

The dome shaped cover 12 is of substantial height and its circular base 25 is of slightly larger diameter than that of the circular extension 21 of base 11 to provide a snug friction fit therewith. The aforementioned locking means 23 is mounted on the circular portion 25 and is comprised of a rotatable shaft 26 having an L-shaped keeper 27 mounted at the end thereof and anchored thereat by a lock access opening 28 and lock nuts 29,29 positioned on opposite sides of the cover 12. Additionally, the L-shaped keeper 27 is comprised of a long leg 27a and a short leg 27b with the leg 27a dimensioned to be the same length as the longitudinal opening 22b of the bayonet opening 22 for reasons to be explained.

Figure 3:
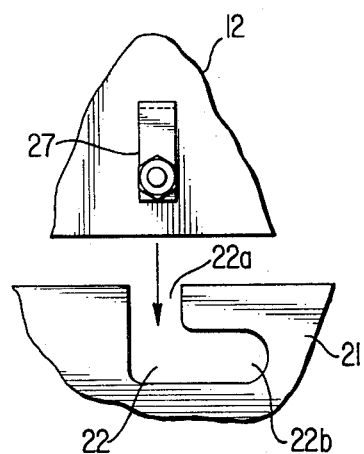
Figure 4:
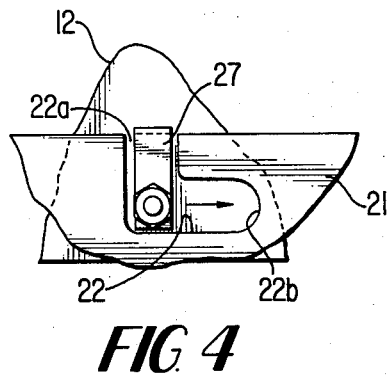

FIGS. 3 through 7 of the drawings illustrate the sequence of operation of the new and novel locking means as viewed from the interior of the housing. Referring to FIG. 3, the cover 12 with the keeper disposed in a vertical position is moved toward the base with the keeper 27 in alignment with the entrance opening 22a and as seen in FIG. 4 the same is shown in mating arrangement therewith which serves to bring the cover into frictional engagement with the base as previously mentioned. The base and cover are then rotated relative to each other whereby the end of the longitudinal opening 22b is caused to move toward the keeper 27 as shown in FIG. 5. Thereafter the keeper 27 is caused to rotate, as illustrated in FIG. 6, whereby the same is disposed in parallel relationship with the opening 22b and the leg 27b extending into engagement with the base wall forming the entrance opening 22 to effect the locking of the cover with respect to the base. To unlock the cover with respect to the base the steps of locking procedure are reversed.

A key 30 serves to control the movement of the shaft 26 and the keeper 27 by inserting the same into the opening 28.

Figure 2:
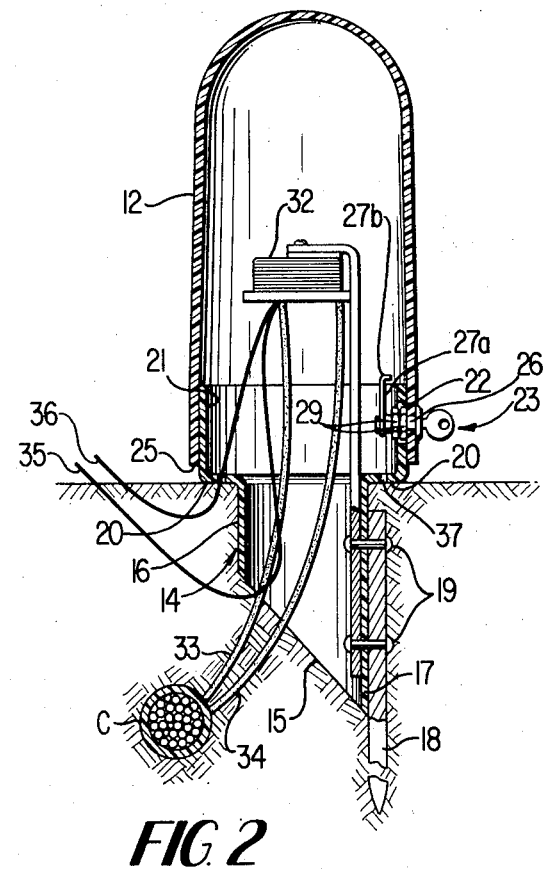
FIG. 2 is a sectional view of the housing taken on lines 2—2 of FIG. 1.

With further reference to FIGS. 2 and 7, the base provides a support for a leg 31 extending upwardly above the top of the extension 21. The lower portion of the leg 31 is secured to the longer section 17 of the base 11 by the same securing means 19 which mount the ground stake 18 thereto. The upper end of the leg 31 supports a junction box, tap or the like 32 having leads 33, 34, 35, 36 associated therewith. The leads 33, 34 are adapted to be connected to or are a part of the buried cable C, e.g., for cable television, with the remaining leads 35, 36 ultimately extending to the place of use, e.g., a home television set. In this regard the outgoing leads 35, 36 may be threaded through one or all of the openings 37 provided in the flange 20 of the base 11. It is to be understood that more wires may be involved in connecting the underground cable to the point of use and that the leads 33–36 are merely shown for purposes of illustration. While the component parts of the housing, that is, the base stake and cover, can be made from any material desired, the preferred material is plastic, e.g., polyethylene, as the same is economical, durable and easy to work with; and the stake is preferably metal.

Alternatively, the stake 18 can be formed as an integral part of the base 11 and the disposition of the bayonet opening and locking means can be reversed.

In use when it is desired to tap into an underground cable, the base and its stake are positioned adjacent the cable C and forced into the ground with the flange 20 acting as a stop limiting surface and the stake 18 as the ground anchor. The electrical taps are then made via leads 33 and 34 and the cover is thereafter placed over the base and locked thereto via the locking means described hereinabove in conjunction with FIGS. 3 through 7.

What is claimed is:

1. A housing comprised of a tubular base member having a portion adapted to be inserted into the ground and a portion extending thereabove, means supported on the base adapted to be protected against unauthorized personnel, a cover member having a tubular portion frictionally engaging the tubular portion of the base extending above the ground, and encasing the means to be protected, and means disposed between the base and the cover locking one to the other, wherein the locking means is comprised of a bayonet opening in one of said members and a keeper in the other whereby the keeper is adapted to be positioned in the longitudinal portion of the bayonet opening for effecting the said locking, and further including a shaft, movably disposed on one of said members with said keeper being disposed on one end of said shaft and control means for moving said shaft and said keeper into and out of engagement with said opening, wherein the keeper is L-shaped with the sort leg thereof being moved into engagement with a wall forming the opening for effecting the locking of one member to the other.

2. The housing of claim 1 wherein the control means is a key adapted to engage the shaft for moving the same and the keeper therewith.

3. The housing of claim 2 wherein the long leg of the keeper is of the same dimension as the long leg of the bayonet opening and is disposed in parallel relationship therewith in its locking position.

4. The housing of claim 3 wherein the base and cover are made of plastic.

5. The housing of claim 4 wherein a stake is mounted on the base for anchoring the same in the ground.

6. The housing of claim 5 wherein the base is formed with a horizontal portion disposed between the lower and upper portions and acting as a ground engaging limiting surface.

7. The housing of claim 6 wherein openings are provided in the horizontal portion permitting lead wires to be threaded therethrough.

* * * * *